United States Patent
Yamamoto et al.

(10) Patent No.: US 6,559,195 B1
(45) Date of Patent: May 6, 2003

(54) MICROPOROUS FILM

(75) Inventors: Kazushige Yamamoto, Ibaraki (JP); Shigeru Fujita, Ibaraki (JP); Yoshihiro Uetani, Ibaraki (JP); Shunsuke Noumi, Ibaraki (JP); Hideyuki Emori, Ibaraki (JP); Yutaka Yamamura, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/830,695

(22) PCT Filed: Aug. 28, 2000

(86) PCT No.: PCT/JP00/05779

§ 371 (c)(1), (2), (4) Date: Apr. 30, 2001

(87) PCT Pub. No.: WO01/16219

PCT Pub. Date: Mar. 8, 2001

(30) Foreign Application Priority Data

Aug. 31, 1999 (JP) .......................................... 11/246235

(51) Int. Cl.[7] .................................................. C08J 9/00
(52) U.S. Cl. ........................................ 521/134; 525/210
(58) Field of Search ........................... 525/210; 521/134

(56) References Cited

U.S. PATENT DOCUMENTS 4,699,857 A * 10/1987 Giovannoni et al.
5,252,385 A * 10/1993 Kagawa et al.

FOREIGN PATENT DOCUMENTS

| JP | A63308866 | 12/1988 |
| JP | A7133363 | 5/1995 |
| JP | A10204199 | 8/1998 |
| JP | A10298325 | 11/1998 |

* cited by examiner

*Primary Examiner*—Morton Foelak
(74) *Attorney, Agent, or Firm*—Birch, Stewart, Kolasch & Birch, LLP

(57) ABSTRACT

To provide a microporous film having excellent permeability and mechanical strength as well as excellent SD function at low temperatures and film-breaking resistance at high temperatures. A microporous film made of a resin composition at least comprising 1 to 50% by weight of a ring-opening polymer of an unsaturated condensed alicyclic compound, and 1 to 50% by weight of one or more resin components selected from the group consisting of polyolefins having a weight-average molecular weight of 500000 or less, thermoplastic elastomers and graft copolymers.

16 Claims, No Drawings

MICROPOROUS FILM

This application is the national phase under 35 U.S.C. §371 of PCT International Application No. PCT/JP00/05779 which has an International filing date of Aug. 28, 2000, which designated the United States of America.

TECHNICAL FIELD

The present invention relates to a microporous film. More particularly, the present invention relates to a microporous film which is used for separators for batteries.

BACKGROUND ART

Non-aqueous electrolytic batteries in which a light metal such as lithium is used as an electrode have high energy density and little self-discharge. Therefore, the application range of these batteries has broadened and has played a part in the trend towards high performance and miniaturization in electronic devices. As electrodes for the non-aqueous electrolytic batteries described above, there have been used spirally wound group in which the battery is constituted by laminating and winding a cathode, an anode and a separator in ribbon-shapes, whereby a wide effective electrode area is secured. In the separator, the short-circuiting of both electrodes is basically prevented, and at the same time the battery reaction can be carried out by transmitting ions owing to its microporous structure. However, those having a so-called "shut-down" function (SD function), wherein a resin is thermally deformed with an increase in the internal temperature of the battery when abnormal electric current is generated due to an improper connection at the external of the battery or the like, so that the resin is prevented from having microporous structure, thereby stopping the battery reaction, have been employed, from the viewpoint of improving the safety.

As the separators having the SD function described above, there have been known, for instance, microporous films made of polyethylenes, and microporous films having a multi-layered structure made of polyethylenes and polypropylenes.

However, with the recent progress in the lithium ion secondary batteries and the like, it is desired not only that the separator has the SD function described above, but also that the separator has heat resistance even at higher temperatures, because when the temperature is further raised after being shut-down, the separator itself is subjected to film-breaking upon melting (melt-down), or plasticization to be in a breakable state, so that there arise some risks of ignition and explosion. Especially, as the developments in the battery having high capacity and the reduction of the internal resistance of the battery progress, factors such as increasing heat generation arise, thereby making it increasingly important.

In view of the problems mentioned above, there have been known a separator for a battery in which the greater the difference between the shut-down temperature (SD temperature) and the film-breaking temperature, and the higher the film-breaking temperature, the better the high-temperature properties and the higher the safety. For instance, Japanese Patent Laid-Open No. Sho 63-308866 discloses a microporous film having high strength and excellent high-temperature property by laminating a single film made of a low-melting point polyethylene and a high-melting point polypropylene. However, the internal resistance of the separator becomes high by the lamination, so that it is inappropriate as a separator for high-performance batteries with the applications requiring high-outputs. In addition, Japanese Patent Laid-Open No. Hei 10-298325 discloses a microporous film made of a high-molecular weight polyethylene composition comprising a polyethylene and a polypropylene each having a low molecular weight. However, when the composition is subjected to a drastic temperature increase, the polyethylene material constituting a majority of the microporous film easily melts and becomes easily breakable, so that its risk is greater. In addition, in the future high-performance battery for such applications requiring high-outputs, there has been desired to have a heat resistance surpassing those of separators comprising polypropylene, which are conventional high heat resistance types.

DISCLOSURE OF INVENTION

An object of the present invention is to provide a microporous film having excellent permeability and mechanical strength, and also having excellent SD function at low temperatures and film-breaking resistance at high temperatures.

Another object of the present invention is to provide a separator for a battery comprising the microporous film of the present invention.

Still another object of the present invention is to provide a battery comprising the separator for a battery of the present invention.

As a result of intensive studies in view of accomplishing the above objects, the present inventors have found that a microporous film, which is made of at least a ring-opening polymer of an unsaturated condensed alicyclic compound, and a polyolefin having a weight-average molecular weight of 500,000 or less, a thermoplastic elastomer, or a graft copolymer, has the excellent features of a low SD temperature and a high film-breaking temperature. The present invention has been accomplished thereby.

Specifically, the present invention relates to:

(1) a microporous film made of a resin composition at least comprising 1 to 50% by weight of a ring-opening polymer of an unsaturated condensed alicyclic compound and 1 to 50% by weight of one or more resin components selected from the group consisting of polyolefins having a weight-average molecular weight of 500000 or less, thermoplastic elastomers and graft copolymers;

(2) a separator for a battery comprising the microporous film of item (1) above; and (3) a battery comprising the separator for a battery of item (2) above.

BEST MODE FOR CARRYING OUT THE INVENTION

The ring-opening polymer of the unsaturated condensed alicyclic compound usable in the present invention (hereinafter also referred to as "first resin component") has an aliphatic ring and a double bond derived from its monomer units as the main component. In addition, a part of the double bond may be hydrogenated in the ring-opening polymer.

The above-mentioned unsaturated condensed alicyclic compounds are roughly classified into the following three series of compounds. A first series of compounds include, among those classified as the condensed alicyclic compounds in a narrow sense, unsaturated compounds one of which rings has a double bond incorporated into the main chain after the ring opening polymerization. In addition, derivatives in which some of hydrogen atoms of these unsaturated compounds are substituted with other substituents can be also used as unsaturated condensed alicyclic compounds. Concrete examples thereof include bicyclo[3.2.0]hept-6-ene, bicyclo[4.2.0]oct-7-ene, and derivatives thereof, and the like.

A second series of compounds include, among those classified as the bridge-ring cyclic compounds, unsaturated compounds one of which rings has a double bond incorporated into the main chain after the ring opening polymerization. In addition, derivatives in which some of hydrogen atoms of these unsaturated compounds are substituted with other substituents can be also used as unsaturated condensed alicyclic compounds. Concrete examples thereof include bicyclo[2.2.1]hept-5-ene (also referred in the present specification as norbornene); norbornene derivatives such as bicyclo[2.2.1]hept-5-ene-2,3-dicarboxymethyl esters; bicyclo[2.2.2]oct-2-ene and derivatives thereof, and the like.

A third series of compounds include, compounds having bridge ring and condensed aliphatic ring, each of which compounds has an aliphatic ring and a double bond in its main chain after the ring opening polymerization. Concrete examples thereof include tricyclo[$5.2.1.0^{2.6}$]deca-3,8-diene (dicyclopentadiene), tetracyclododecene, and derivatives thereof, and the like.

Among these unsaturated condensed alicyclic compounds, norbornene and norbornene derivatives are preferable, from the viewpoints of feeding raw materials and the like. In addition, these unsaturated condensed alicyclic compounds can be used alone, or in admixture of two or more kinds, or they can be sequentially subjected to ring opening polymerization.

As the ring-opening polymer of the unsaturated condensed alicyclic compound mentioned above, polynorbornenes and the like are preferably used. Among them, the polynorbornene rubbers having a high average molecular weight are more preferably used, from the viewpoint of the dispersibility.

In addition, in the microporous film of the present invention, there are employed one or more resin components selected from the group consisting of polyolefins having a weight-average molecular weight of 500000 or less, thermoplastic elastomers and graft copolymers (hereinafter also referred to as "second resin component").

The polyolefins having a weight-average molecular weight of 500000 or less are preferably polyolefins having a weight-average molecular weight of less than 500000, more preferably those having a weight-average molecular weight of 300000 or less, from the viewpoint of lowering the SD temperature. The polyolefins include polyolefin resins such as polyethylenes and polypropylenes; and modified polyolefin resins such as ethylene-acrylic monomer copolymers and ethylene-vinyl acetate copolymers. Especially preferable are those polyethylene resins having a weight-average molecular weight of less than 500000, more especially preferably a weight-average molecular weight of 300000 or less.

The thermoplastic elastomers include thermoplastic elastomers such as polystyrene-based, polyolefin-based, polydiene-based, polyvinyl chloride-based, and polyester-based thermoplastic elastomers.

The graft copolymers include a graft copolymer in which a main chain comprises a polyolefin, and a vinyl polymer having a non-compatible group is grafted thereon as a side chain, and the vinyl polymer is preferably polyacrylates, polymethacrylates, polystyrenes, polyacrylonitriles, and polyoxyalkylenes. Here, the non-compatible group means a group which is incompatible to the polyolefin, and includes, for instance, groups derived from the vinyl polymer.

These resins can be used alone or in combination of two or more kinds.

Among them, the polyolefin resins having a weight-average molecular weight of 500000 or less, especially low-melting point polyethylenes having a weight-average molecular weight of less than 500000, polyolefin elastomers having crystallinity, graft copolymers having a low-melting point polymethacrylate as a side chain, and the like are preferable, from the viewpoint of giving low SD temperatures. Concretely, the polyolefins having a weight-average molecular weight of less than 500000 and/or the thermoplastic elastomers, of which low-temperature side observed by a differential scanning calorimeter (DSC) corresponds to a part of peaks at 100° to 140° C. are preferable.

In addition, in order to enhance the strength of the microporous film, it is preferable that an ultra-high molecular weight polyolefin resin such as an ultra-high molecular weight polyethylene having a weight-average molecular weight exceeding 500000 is further formulated.

The microporous film of the present invention is made of a resin composition which comprises the first resin component and the second resin component mentioned above, and further comprises an ultra-high molecular weight polyolefin resin having a weight-average molecular weight exceeding 500000 as occasion demands.

In the present invention, the amount of the first resin component formulated is in the range of from 1 to 50% by weight, preferably from 1 to 40% by weight, more preferably from 1 to 35% by weight, of the resin composition. The lower limit of the amount formulated is 1% by weight or more, from the viewpoint of obtaining a microporous film having a sufficient heat resistance, and its upper limit is 50% by weight or less, from the viewpoint of maintaining the properties of the microporous film as a separator for a battery.

In addition, the amount of the second resin component formulated is in the range of from 1 to 50% by weight, preferably from 5 to 45% by weight, more preferably from 5 to 40% by weight, of the resin composition. The lower limit of the amount formulated is 1% by weight or more, from the viewpoint of obtaining a sufficient SD temperature, and its upper limit is 50% by weight or less, from the viewpoints of having a sufficient porosity and maintaining the properties of the microporous film as a separator for a battery.

In addition, the amount of the ultra-high molecular weight polyolefin resin having a weight-average molecular weight exceeding 500000 formulated is preferably from 5 to 98% by weight, more preferably from 10 to 90% by weight, of the resin composition.

Next, the process for producing a microporous film according to the present invention will be described.

In the production of the microporous film according to the present invention, there can be utilized known processes such as dry-type film-forming processes and wet-type film-forming processes. The microporous film can be produced by, for instance, mixing the above-mentioned resin composition with a solvent; molding the mixture into a sheet-like form, with kneading and melting with heating the mixture; thereafter pressing the molded mixture and stretching it to uniaxial or multiaxial directions; and removing the solvent by extraction.

The solvent includes, for instance, aliphatic or cyclic hydrocarbons such as nonane, decane, undecane, dodecane, decalin, and liquid paraffins; mineral oil distillates of which boiling points correspond to these hydrocarbons and the like. Non-volatile solvents containing large amounts of alicyclic hydrocarbons such as liquid paraffins are preferable. In addition, it is preferable that the amount of the solvent used is from 60 to 95% by weight of the mixture of the resin composition and the solvent. The process of kneading the mixture of the resin composition and the solvent to mold the mixture into a sheet-like form can be carried out by a known process. A sheet-like molded product may be obtained by kneading the mixture in a batch process using a Banbury mixer, a kneader, or the like, and thereafter interposing the mixture between chilled metal plates to rapidly cool the mixture, thereby crystallizing the molded product by rapid cooling. Alternatively, a sheet-like molded product may be obtained by using an extruder equipped with a T die or the like. Here, kneading may be carried out under appropriate temperature conditions, which are not particularly limited. Kneading is preferably carried out at 100° to 200° C.

The thickness of the sheet-like molded product obtained in the manner described above is not particularly limited. The thickness is preferably from 3 to 20 mm, and it may be reduced to from 0.5 to 2 mm by pressing treatment such as heat press. In addition, the temperature of the pressing treatment is preferably from 100° to 140° C.

The method of stretching treatment of the sheet-like molded product mentioned above is not particularly limited. The method may be usual tenter method, rolling method, inflation method or a combination of these methods. In addition, any of the uniaxial stretching, biaxial stretching and the like can be applied. Also, in the case of the biaxial stretching, it may be either vertical and horizontal, simultaneous stretching or sequential stretching. It is preferable that the temperature for the stretching treatment is from 100° to 140° C.

The treatment of removing a solvent is a process of removing a solvent from a sheet-like molded product, thereby forming a microporous structure. For instance, the treatment can be carried out by washing the sheet-like molded product with a dissolving solvent to remove the solvent remaining in the molded product. The dissolving solvent includes easily volatile dissolving solvents including hydrocarbons such as pentane, hexane, heptane and decane; chlorinated hydrocarbons such as methylene chloride and carbon tetrachloride; fluorinated hydrocarbons such as trifluoroethane; and ethers such as diethyl ether and dioxane. These dissolving solvents can be used alone or in admixture of two or more kinds. The washing method using the above dissolving solvent is not particularly limited. The washing method includes, for instance, a method of immersing a sheet-like molded product in a dissolving solvent to extract away the solvent; a method of showering a dissolving solvent to a sheet-like molded product, and the like.

After the microporous film is obtained by forming the above-mentioned resin composition into a film by these known methods, it is preferable that the resin composition constituting the microporous film is cross-linked. In the cross-linking, there can be employed one or more kinds selected from the group consisting of heat, ultraviolet rays, and electron beams. By this cross-linking, all or a part of the double bonds of the ring-opening polymer of the unsaturated condensed alicyclic compound disappear. Among them, the cross-linking treatment employing heat or ultraviolet rays is desired, from the viewpoint of the structural stability of the microporous film. The heat resistance of the above-mentioned microporous film (film-breaking resistance at high temperatures) is greatly improved by subjecting the microporous film to these cross-linking treatments.

Although the reasons for improving the heat resistance are not necessarily clear, it is thought that the reasons are due to the facts that the polymer radical caused by each treatment is added to the double bond, and during the course of addition, the cross-linking reaction takes place among the ring-opening polymers of the unsaturated condensed alicyclic compounds themselves or between the ring-opening polymer and other resin components, and that the glass transition temperature of the polymer chain itself is greatly raised by the disappearance of the double bond in the main chain. The proportion of disappeared double bonds is properly selected in consideration of the desired heat resistance. It is preferable that the disappearance ratio is from 80 to 100% (calculated on the basis of the size of the peaks of IR chart). Therefore, the heat resistance is thought to be greatly improved by these reasons.

When heat is employed as a means for the above-mentioned cross-linking treatment, the method may be a one-step heat treatment method in which the heat treatment is carried out once, or the method may be a multi-step heat treatment in which the heat treatment is firstly carried out at a lower temperature, and thereafter the heat treatment is further carried out at a higher temperature. Alternatively, the method may be a temperature-raising heat treatment method in which the heat treatment is carried out with raising the temperature. It is desired that the treatment is carried out without impairing various original properties of the microporous film such as air permeability. In the case of the one-step heat treatment, although it may depend upon the composition of the microporous film, it is preferable that the treatment is carried out at 40° to 140° C. In addition, when starting the heat treatment from a lower temperature, and thereafter raising the treatment temperature, the heat resistance gradually improves along with the curing of the microporous film, whereby the microporous film can be exposed to high temperatures without impairing its various original properties such as air permeability by heating. Therefore, in order to complete the heat treatment in a short period of time without impairing the various properties, a multi-step or temperature-raising heat treatment method is preferable.

Although the first heat treatment temperature of the multi-step heat treatment method may depend upon the composition of the microporous film, the first heat treatment temperature is preferably from 40° to 90° C. Although the second heat treatment temperature may depend upon the composition of the microporous film, the second heat treatment temperature is preferably from 90° to 140° C. In addition, a heat treatment of a third or further steps may be additionally carried out at a further higher temperature in a short period of time as occasion demands. Although the treatment time may depend upon the composition of the microporous film, it is preferable that the first heat treatment is carried out for 3 to 48 hours or so, and that the second heat treatment at a higher temperature is carried out for 0.5 to 6 hours or so. In the case of the temperature-raising heat treatment method, the method may be carried out under conditions which are similar to those in the multi-step heat treatment method mentioned above. The atmosphere during the heat treatment may be the air, or it may be an atmosphere of an inert gas such as nitrogen gas or argon gas from the viewpoint of controlling the cross-linking state.

When the ultraviolet rays are employed, the cross-linking treatment can be carried out by, for instance, irradiating ultraviolet rays directly to a microporous film after film formation in the air with a mercury lamp, or immersing the microporous film after film formation in a methanol solution containing a polymerization initiator, drying the solvent, and irradiating the resulting microporous film in the same manner. In addition, in order to attain heat control during irradiation, the ultraviolet ray irradiation may be carried out in water.

When the electron beams are employed, the cross-linking treatment is carried out by, for instance, subjecting a microporous film after film formation to irradiation in an amount of the radiation rays of from 0.1 to 10 Mrad. The atmosphere during the irradiation may be the air, or it may be an atmosphere of an inert gas such as nitrogen gas or argon gas, from the viewpoint of controlling the cross-linking state, which may be the same as in the heat treatment method.

In addition, subsequent to the above-mentioned cross-linking treatment step, there may be some cases where the microporous film is generally subjected to heat setting (thermal fixing) in order to prevent the heat shrinkage. Especially in the present invention, it is possible that the microporous film is substantially subjected to heat setting depending upon the treatment conditions by carrying out the heat treatment for the cross-linking treatment as mentioned above. When the heat setting is insufficient, the microporous film may be subjected to heat setting by further heating the microporous film after the above-mentioned cross-linking treatment, in order to further prevent the heat shrinkage. The heat setting may be carried out at a temperature of, for instance, 110° to 140° C. for 0.5 to 2 hours or so.

The thickness of the microporous film obtained in the manner as described above is preferably from 1 to 60 $\mu$m, more preferably from 5 to 45 $\mu$m. Its porosity is preferably from 20 to 80%, more preferably from 25 to 75%. As the permeability, for instance, the air permeability determined in accordance with JIS P8117 is preferably from 100 to 1000 seconds/100 cc, more preferably from 200 to 900 sec/100 cc. As its mechanical strength, for instance, the puncture strength is preferably 200 gf/25 $\mu$m or more, more preferably 300 gf/25 $\mu$m or more. Here, the method for determining the puncture strength includes the one described in Examples described below.

The SD temperature of the microporous film is preferably from 120° to 150° C., more preferably from 120° to 140° C. Its film-breaking temperature is preferably 150° C. or more, more preferably 200° C. or more.

Since the microporous film of the present invention is used as a separator for a battery having excellent permeability and mechanical strength as well as having excellent low-temperature SD effect and film-breaking resistance at high temperatures as described above, there can be expected to further improve the safety for various sizes and applications of the batteries.

It is preferable that the separator for a battery of the present invention is used as a separator for a non-aqueous electrolytic battery, and it is preferable that the battery of the present invention is used as a non-aqueous electrolytic battery. The non-aqueous electrolytic battery may be any of those in which the above-mentioned microporous film is used as a separator, and its structure, constituents, and the production process are not particularly limited, so long as those employed in a usual non-aqueous electrolytic battery and its production process are used. Since the non-aqueous electrolytic battery of the present invention uses the microporous film of the present invention, it is excellent in the safety.

The present invention will be described hereinbelow by illustration of the working examples, without intending to limit the present invention to these examples. Here, the testing methods in Examples are as follows.

(Film Thickness)

Determinations was taken from 1/10000 thickness gauge and from a scanning electromicrograph (magnification: 10000) of a cross section of a microporous film.

(Porosity)

Calculated by the following equation, from a weight W (g) per unit area S (cm$^2$) of a film, an average thickness t ($\mu$m) and density d (g/cm$^3$).

$$\text{Porosity (\%)} = (1-(10^{-4} \times W/S/t/d)) \times 100$$

(Air Permeability)

Determined in accordance with JIS P8117.

(Puncture Strength)

A puncture strength test was carried out by using a penetration testing machine "KES-G5" manufactured by Kato Tech K.K. A maximum load was read off from the resulting load-displacement curve, and defined as a puncture strength. As the needle, one having a diameter of 1 mm and a radius of curvature of a tip end of 0.5 mm was used, and the test was carried out at a speed of 2 cm/second.

(Shut-Down Temperature (SD Temperature))

There were used a stainless steel cell comprising a cylindrical testing chamber having a diameter of 25 mm, the testing chamber being sealable, a lower electrode made of a platinum plate (thickness: 1.0 mm) having a diameter of 20 mm, and an upper electrode made of the platinum plate having a diameter of 10 mm. The measurement sample which was punctured to a diameter of 24 mm was immersed in an electrolyte to impregnate the electrolyte thereinto. The impregnated measurement sample was clamped between the electrodes, and set in the cell. The electrodes were provided with a given surface pressure by providing a spring in the cell. As the electrolyte, there was used one in which lithium borofluoride was dissolved in a solvent prepared by mixing propylene carbonate and dimethoxyethane at a volume ratio of 1:1, so that the lithium borofluoride has a concentration of 1.0 mol/l.

A thermocouple thermometer and an ohmmeter were connected to this cell to enable determination of the temperature and the resistance. The cell was then placed in a thermostat at 180° C., and the temperature and the resistance were determined. The average heating rate from 100° to 150° C. was 10° C./min. By this determination, the temperature at which the resistance attained to 100 $\Omega \cdot$cm$^2$.

(Thermal Film-Breaking Temperature)

A strip-shaped sample having a width of 3 mm was placed with 10 mm between the chucks, and set in a thermal-stress-strain analyzer "TMA/SS 100" manufactured by Seiko Instruments Inc., and the temperature was raised at a heating rate at 2° C. per minute. The evaluation was made from the state during heating, and the temperature when the stripped-shaped sample was broken was defined as a thermal film-breaking temperature.

(Area Shrinkage Ratio)

The film cut out at 60 mm in diameter was read off with an image scanner at 144 dpi, and the area converted to the number of picture elements was defined as a blank value. Next, the same film was kept in a thermostatic dryer at 105° C. for 1 hour, and then taken out. Thereafter, an image was read off with the image scanner at 144 dpi, and the area converted to the number of picture elements was defined as a value after the heat treatment. The area shrinkage ratio R (%) was obtained from the number of the picture elements of the area of the blank and that after the heat treatment in accordance with the following equation:

$$R(\%)=100\times(P0-P1)/P0,$$

wherein P0 is the number of picture elements before shrinkage; and P1 is the number of picture elements after shrinkage.

EXAMPLE 1

Twenty parts by weight of a resin composition composed of 20% by weight of a norbornene ring-opening polymer powder (manufactured by Nippon Zeon Co., Ltd.; trade name: NORSOREX NB; weight-average molecular weight: 2000000 or more, hereinafter the same), 20% by weight of a polyethylene (melting point: 132° C., hereinafter the same) having a weight-average molecular weight of 300000, and 60% by weight of an ultra-high molecular polyethylene (melting point: 144° C., hereinafter the same) having a weight-average molecular weight of 3000000; and 80 parts by weight of a liquid paraffin (solidification point: −15° C.; kinematic viscosity at 40° C.: 59 cst, hereinafter the same) were homogeneously mixed in a slurry state. The resulting mixture was melt-kneaded at a temperature of 160° C. with a small-scale kneader for about 60 minutes, to give a kneaded mixture. Thereafter, the resulting kneaded mixture clamped between metal plates was cooled to 0° C., and rapidly cooled into a sheet-like form. Each of these rapidly cooled sheet-like resins was heat-pressed at a temperature of 115° C. until the thickness of the sheet attained to from 0.4 to 0.6 mm, and simultaneously biaxially stretched at a temperature of 115° C. in 3.5-×3.5-folds in vertical and horizontal directions, and the solvent-removing treatment was carried out by using heptane. Subsequently, the resulting microporous film was subjected to cross-linking by applying heat at 85° C. in the air for 6 hours, and thereafter heat-treated at 110° C. for 2 hours, to give a microporous film.

EXAMPLE 2

Twenty parts by weight of a resin composition composed of 15% by weight of the norbornene ring-opening polymer powder, 15% by weight of a polyethylene (melting point: 130° C., hereinafter the same) having a weight-average molecular weight of 100000, and 70% by weight of the ultra-high molecular polyethylene having a weight-average molecular weight of 3000000; and 80 parts by weight of the liquid paraffin were homogeneously mixed in a slurry state. The resulting mixture was melt-kneaded at a temperature of 160° C. with a small-scale kneader for about 60 minutes, to give a kneaded mixture. Thereafter, the resulting kneaded mixture clamped between metal plates was cooled to 0° C., and rapidly cooled into a sheet-like form. Each of these rapidly cooled sheet-like resins was heat-pressed at a temperature of 115° C. until the thickness of the sheet attained to from 0.4 to 0.6 mm, and simultaneously biaxially stretched at a temperature of 115° C. in 3.5-×3.5-folds in vertical and horizontal directions, and the solvent-removing treatment was carried out by using heptane. Subsequently, the resulting microporous film was subjected to cross-linking by applying heat at 85° C. in the air for 6 hours, and thereafter heat-treated at 110° C. for 2 hours, to give a microporous film.

EXAMPLE 3

Twenty-five parts by weight of a resin composition composed of 12% by weight of the norbornene ring-opening polymer powder, 15% by weight of the polyethylene having a weight-average molecular weight of 100000, and 73% by weight of an ultra-high molecular polyethylene (melting point: 135° C.) having a weight-average molecular weight of 600000; and 75 parts by weight of the liquid paraffin were homogeneously mixed in a slurry state. The resulting mixture was melt-kneaded at a temperature of 160° C. with a small-scale kneader for about 60 minutes, to give a kneaded mixture. Thereafter, the resulting kneaded mixture clamped between metal plates was cooled to 0° C., and rapidly cooled into a sheet-like form. Each of these rapidly cooled sheet-like resins was heat-pressed at a temperature of 110° C. until the thickness of the sheet attained to from 0.4 to 0.6 mm, and simultaneously biaxially stretched at a temperature of 110° C. in 3.5-×3.5-folds in vertical and horizontal directions, and the solvent-removing treatment was carried out by using heptane. Subsequently, the resulting microporous film was subjected to cross-linking by applying heat at 85° C. in the air for 6 hours, and thereafter heat-treated at 110° C. for 2 hours, to give a microporous film.

EXAMPLE 4

Twenty parts by weight of a resin composition composed of 12% by weight of the norbornene ring-opening polymer powder, 15% by weight of an olefinic thermoplastic elastomer (softening temperature: 102° C., "TPE821" manufactured by Sumitomo Chemical Co., Ltd.), and 73% by weight of the ultra-high molecular polyethylene having a weight-average molecular weight of 3000000; and 80 parts by weight of the liquid paraffin were homogeneously mixed in a slurry state. The resulting mixture was melt-kneaded at a temperature of 160° C. with a small-scale kneader for about 60 minutes, to give a kneaded mixture. Thereafter, the resulting kneaded mixture clamped between metal plates was cooled to 0° C., and rapidly cooled into a sheet-like form. Each of these rapidly cooled sheet-like resins was heat-pressed at a temperature of 115° C. until the thickness of the sheet attained to from 0.4 to 0.6 mm, and simultaneously biaxially stretched at a temperature of 115° C. in 3.5-×3.5-folds in vertical and horizontal directions, and the solvent-removing treatment was carried out by using heptane. Subsequently, the resulting microporous film was subjected to cross-linking by applying heat at 95° C. in the air for 6 hours, and thereafter heat-treated at 115° C. for 2 hours, to give a microporous film.

EXAMPLE 5

Twenty parts by weight of a resin composition composed of 12% by weight of the norbornene ring-opening polymer powder, 15% by weight of a graft copolymer (main chain: low-density polyethylene; side chain: methyl methacrylate resin; compositional ratio 70/30; softening temperature: 97° C.; "Modiper A1200" manufactured by NOF Corporation), and 73% by weight of the ultra-high molecular polyethylene having a weight-average molecular weight of 3000000; and 80 parts by weight of the liquid paraffin were homogeneously mixed in a slurry state. The resulting mixture was melt-kneaded at a temperature of 160° C. with a small-scale kneader for about 60 minutes, to give a kneaded mixture. Thereafter, the resulting kneaded mixture clamped between metal plates was cooled to 0° C., and rapidly cooled into a sheet-like form. Each of these rapidly cooled sheet-like resins was heat-pressed at a temperature of 115° C. until the thickness of the sheet attained to from 0.4 to 0.6 mm, and simultaneously biaxially stretched at a temperature of 115° C. in 3.5-×3.5-folds in vertical and horizontal directions, and the solvent-removing treatment was carried out by using heptane. Subsequently, the resulting microporous film was subjected to cross-linking by applying heat at 95° C. in the air for 6 hours, and thereafter heat-treated at 110° C. for 2 hours, to give a microporous film.

EXAMPLE 6

The uncross-linked microporous film subjected to the solvent-removing treatment obtained in Example 4 was heat-treated at 120° C. for 5 minutes, and thereafter the heat-treated microporous film was subjected to ultraviolet ray irradiation under the conditions of 1 $J/cm^2$ using a high-pressure mercury lamp, to give a microporous film of the present invention.

COMPARATIVE EXAMPLE 1

The film was formed in the same manner as in Example 1 except for using 20 parts by weight of a resin composition composed of 75% by weight of the ultra-high molecular polyethylene having a weight-average molecular weight of 3000000, and 25% by weight of a low-molecular polyethylene (molecular weight: 2000; "Hiwax 200P" manufactured by MITSUI CHEMICALS INC.); and 80 parts by weight of the liquid paraffin, and heat-treating the resulting microporous film in the air at 115° C. for 2 hours, to give a microporous film.

COMPARATIVE EXAMPLE 2

The film was formed in the same manner as in Example 1 except for using 15 parts by weight of a resin composition composed of 67% by weight of the polyethylene having a weight-average molecular weight of 300000 and 33% by weight of the ultra-high molecular polyethylene having a weight-average molecular weight of 3000000; and 85 parts by weight of the liquid paraffin, and heat-treating the resulting microporous film in the air at 115° C. for 2 hours, to give a microporous film.

COMPARATIVE EXAMPLE 3

The film was formed in the same manner as in Example 1 except for using 17 parts by weight of an ultra-high molecular polyethylene having a weight-average molecular weight of 2000000 (melting point: 143° C.); and 83 parts by weight of the liquid paraffin, and heat-treating the resulting microporous film in the air at 125° C. for 2 hours, to give a microporous film.

COMPARATIVE EXAMPLE 4

Fifteen parts by weight of a resin composition composed of 2% by weight of the norbornene ring-opening polymer powder, and 98% by weight of the ultra-high molecular polyethylene having a weight-average molecular weight of 3000000; and 85 parts by weight of the liquid paraffin were homogeneously mixed in a slurry state. The resulting mixture was melt-kneaded at a temperature of 160° C. with a twin-screw kneader for 5 minutes, to give a kneaded mixture. The resulting kneaded mixture was molded into a gel-like sheet having a thickness of 5 mm with rapidly cooling the kneaded mixture. This sheet was heat-pressed at a temperature of 120° C. until the thickness of the sheet attained to 1 mm, and simultaneously biaxially stretched at a temperature of 125° C. in 4-×4-folds in vertical and horizontal directions, and the solvent-removing treatment was carried out by using heptane. Subsequently, the resulting microporous film was heat-treated at 85° C. in the air for 6 hours, and thereafter heat-treated at 125° C. in the air for 1 hour, to give a microporous film.

The properties of the resulting microporous films obtained in Examples 1 to 6 and Comparative Examples 1 to 4 are shown in Table 1.

TABLE 1

|  | Film Thickness [μm] | Porosity [%] | Air Permeability [sec/100 cc] | Puncture Strength [gf/25 μm] | SD Temp. [° C.] | Thermal Film-Breaking Temp. [° C.] | Area Shrinkage Ratio [%] |
| --- | --- | --- | --- | --- | --- | --- | --- |
| Example 1 | 24 | 50 | 330 | 560 | 129 | 221 | 10 |
| Example 2 | 25 | 47 | 320 | 600 | 127 | 218 | 9 |
| Example 3 | 23 | 40 | 470 | 410 | 125 | 197 | 12 |
| Example 4 | 25 | 42 | 380 | 550 | 131 | 236 | 9 |
| Example 5 | 25 | 40 | 350 | 560 | 133 | 225 | 10 |
| Example 6 | 25 | 42 | 340 | 540 | 133 | 216 | 8 |
| Comparative Example 1 | 24 | 44 | 340 | 570 | 127 | 151 | 18 |
| Comparative Example 2 | 25 | 42 | 410 | 400 | 129 | 155 | 22 |
| Comparative Example 3 | 27 | 58 | 290 | 650 | 149 | 159 | 11 |
| Comparative Example 4 | 26 | 65 | 197 | 510 | 150 | 170 | 13 |

It is seen from the results of Table 1 that each of the microporous films obtained in Examples 1 to 6 has appropriate air permeability and puncture strength, and has low SD temperatures and area shrinkage ratio, and especially has remarkably high thermal film-breaking temperature, as compared with those of the microporous films obtained in Comparative Examples 1 to 4.

INDUSTRIAL APPLICABILITY

The microporous film of the present invention has excellent permeability and mechanical strength as well as excellent shut-down function at low temperatures and thermal film-breaking resistance at high temperatures. Therefore, by using the microporous film as a separator for a non-aqueous electrolytic battery, there is exhibited an effect that the non-aqueous electrolytic battery having excellent safety can be obtained in various sizes and applications.

What is claimed is:

1. A microporous film made of a resin composition at least comprising 1 to 50% by weight of a resin obtained by a ring-opening polymerization of a monomer consisting of an unsaturated condensed alicyclic compound and 1 to 50% by weight of one or more resins selected from the group consisting of polyolefins having a weight-average molecular weight of 500,000 or less, thermoplastic elastomers and graft copolymers.

2. The microporous film according to claim 1, wherein said microporous film is made of a cross-linked resin composition.

3. The microporous film according to claim 1 or 2, wherein the ring-opening polymer of an unsaturated condensed alicyclic compound is a polynorbornene.

4. The microporous film according to claim 1 or 2, wherein the polyolefin having a weight-average molecular weight of 500000 or less is a polyolefin resin having a weight-average molecular weight of less than 500000.

5. The microporous film according to claim 4, wherein the polyolefin resin having a weight-average molecular weight of less than 500000 is a polyethylene resin having a weight-average molecular weight of less than 500000.

6. The microporous film according to claim 1 or 2, wherein said thermoplastic elastomers are polystyrene-based, polyolefin-based, polydiene-based, polyvinyl chloride-based, or polyester-based thermoplastic elastomers.

7. The microporous film according to claim 1 to 2, wherein said graft copolymers are copolymers in which a main chain comprises a polyolefin, and a vinyl polymer having a non-compatible group is grafted thereon as a side chain.

8. The microporous film according to claim 1, further comprising an ultra-high molecular polyolefin resin having a weight-average molecular weight exceeding 500000.

9. The microporous film according to claim 8, wherein said ultra-high molecular polyolefin resin is contained in an amount of 5 to 98% by weight in the resin composition.

10. A separator for a battery comprising the microporous film of claim 1.

11. The separator for a battery according to claim 10, wherein said separator for a battery is a separator for a non-aqueous electrolytic battery.

12. A battery comprising the separator for a battery of claim 10.

13. The battery according to claim 12, wherein the battery is a non-aqueous electrolytic battery.

14. The microporous film according to claim 1, wherein the unsaturated condensed alicyclic compound is at least one selected from the group consisting of bicyclo[3.2.0]hept-6-ene, bicyclo[4.2.0]oct-7-ene, bicyclo[2.2.1]hept-5-ene, bicyclo[2.2.1]hept-5-ene-2,3-dicarboxymethyl ester, bicyclo[2.2.2]oct-2-ene, dicyclopentadiene and tetracyclododecene.

15. The microporous film according to claim 1, wherein the resin obtained by ring-polymerization is obtained by ring-opening polymerization of at least two unsaturated condensed alicyclic compounds.

16. The microporous film according to claim 1, wherein the graft copolymer is a polyolefin and a vinyl polymer which is at least one selected from the group consisting of polyacrylate, polymethacrylate, polystyrene, polyacrylonitrile and polyoxyalkylene.

* * * * *